United States Patent [19]
Wilkie, II

[11] Patent Number: 6,069,787
[45] Date of Patent: May 30, 2000

[54] SWITCHGEAR WITH INTEGRAL PRY SLOT AND A PLANAR BASE

[75] Inventor: William Edward Wilkie, II, Fletcher, N.C.

[73] Assignee: Eaton Corporation, Cleveland, Ohio

[21] Appl. No.: 09/188,477

[22] Filed: Nov. 9, 1998

[51] Int. Cl.$^7$ .................................................... H02B 5/00
[52] U.S. Cl. ...................... 361/605; 361/600; 361/602; 361/608; 361/724; 312/223.1; 312/223.2; 312/348.3; 312/351.2; 312/352
[58] Field of Search ..................................... 361/600–602, 361/605, 603, 615, 616, 622–624, 641, 644, 659, 673, 676, 724, 727; 312/223.1, 223.2, 348.3, 351.2, 351.1, 351.7, 352

[56] References Cited

U.S. PATENT DOCUMENTS

| | | | |
|---|---|---|---|
| 4,361,369 | 11/1982 | Zwillich . | |
| 4,621,878 | 11/1986 | Johnson et al. ...................... | 312/257.1 |
| 4,814,942 | 3/1989 | Robirds et al. . | |
| 5,540,339 | 7/1996 | Lerman ...................................... | 211/26 |
| 5,753,855 | 5/1998 | Nicoli et al. ................................ | 174/49 |
| 5,806,945 | 9/1998 | Anderson et al. .................... | 312/265.3 |
| 5,996,728 | 12/1999 | Stark ........................................ | 181/144 |

OTHER PUBLICATIONS

Cutler–Hammer, Instructions for DSII Metal–Enclosed Low–Voltage Switchgear Assemblies with DS Breakers, Feb. 1998, 37 pp.

*Primary Examiner*—Leo P. Picard
*Assistant Examiner*—Boris Chervinsky
*Attorney, Agent, or Firm*—Martin J. Moran

[57] ABSTRACT

An enclosure for electrical switching apparatus has a base formed by a planar member which extends horizontally to support the enclosure on a support surface. The planar member is generally rectangular with an upturned flange along at least one edge and preferably along three edges, including the front edge and the adjoining side edges. At least one, and preferably a spaced pair of pry slots are provided in these three edges. The pry slots extend into the planar member and the flanges to provide leverage for pry bars. The flanges are stiffened by inwardly directed lips extending along their free edges. The enclosure includes a front section and a rear section with the planar member forming the base for the front section. The electrical switching apparatus is mounted in the front section so that the center of gravity of the enclosure is located there. Preferably, the pair of pry slots both in the front edge and side edges straddle the center of gravity.

20 Claims, 3 Drawing Sheets

SWITCHGEAR WITH INTEGRAL PRY SLOT AND A PLANAR BASE

BACKGROUND OF THE INVENTION

1. Field of the Invention

This invention relates to switchgear in electric power distribution systems, and to the enclosure in such switchgear having integral pry slots for precise positioning of the switchgear.

2. Background of the Invention

Switchgear includes electrical switching apparatus for electric power distribution systems which is disposed within a metal cabinet. Such electrical switching apparatus can include circuit breakers and network protectors which provide protection, and also switches used to isolate parts of a distribution system or to transfer between alternative power sources.

Typically, several pieces of electrical switching apparatus are mounted in a single cabinet. Due to the weight and bulkiness of the resulting switchgear assembly, final placement in an electrical control room is often difficult. Frequently, the installation of this equipment is completed manually. Common practice is to use rollers or pipes underneath the equipment for this purpose. Exact placement is required when matching up with existing copper bus connections, coupling with substation transformers, or matching existing conduit entry. This exact placement often involves prying the assembly into place with oversized pry bars. Damage to the structural base, typically a frame which can include channel members or specially fabricated pieces, usually results.

There is a need, therefore, for switchgear which can be accurately positioned without suffering damage.

More particularly, there is a need for such switchgear which can be pried into precise alignment without permanent distortion.

SUMMARY OF THE INVENTION

These needs and others are satisfied by the invention which is directed to switchgear which includes electrical switching apparatus and an enclosure having a base in the form of a planar member positioned to rest on a horizontal support surface. The planar member has an upturned flange at least along one edge and at least one pry slot at the one edge extending into the planar member and into the upturned flange. This pry slot is sized for engagement by pry bar means. Preferably, the planar member has two additional upturned flanges along additional edges, each of which also has at least one pry slot. The three edges and the associated flanges formed have right-angle corners with the edge between the two corners preferably being the front edge of the planar member. More preferably, the front edge has two spaced-apart pry slots, which when located adjacent the two right-angle corners affords an ideal arrangement for engaging both slots with pry bars to evenly move the enclosure rearward.

The other two edges of the planar member are side edges which also preferably have at least two spaced-apart pry slots. The enclosure can include a second section extending rearward from a fourth edge of the planar member. Typically in such an assembly, however, the center of gravity of the switchgear remains within the first section in which the electrical switching apparatus is mounted. Preferably, the two pry slots in the side edges of the panel members straddle the center of gravity so that the switchgear can be translated laterally by the use of two pry bars without rotating the enclosure for better control over final positioning.

For added strength and stiffness, the upturned flanges preferably have inwardly directed lips extending along a free edge.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
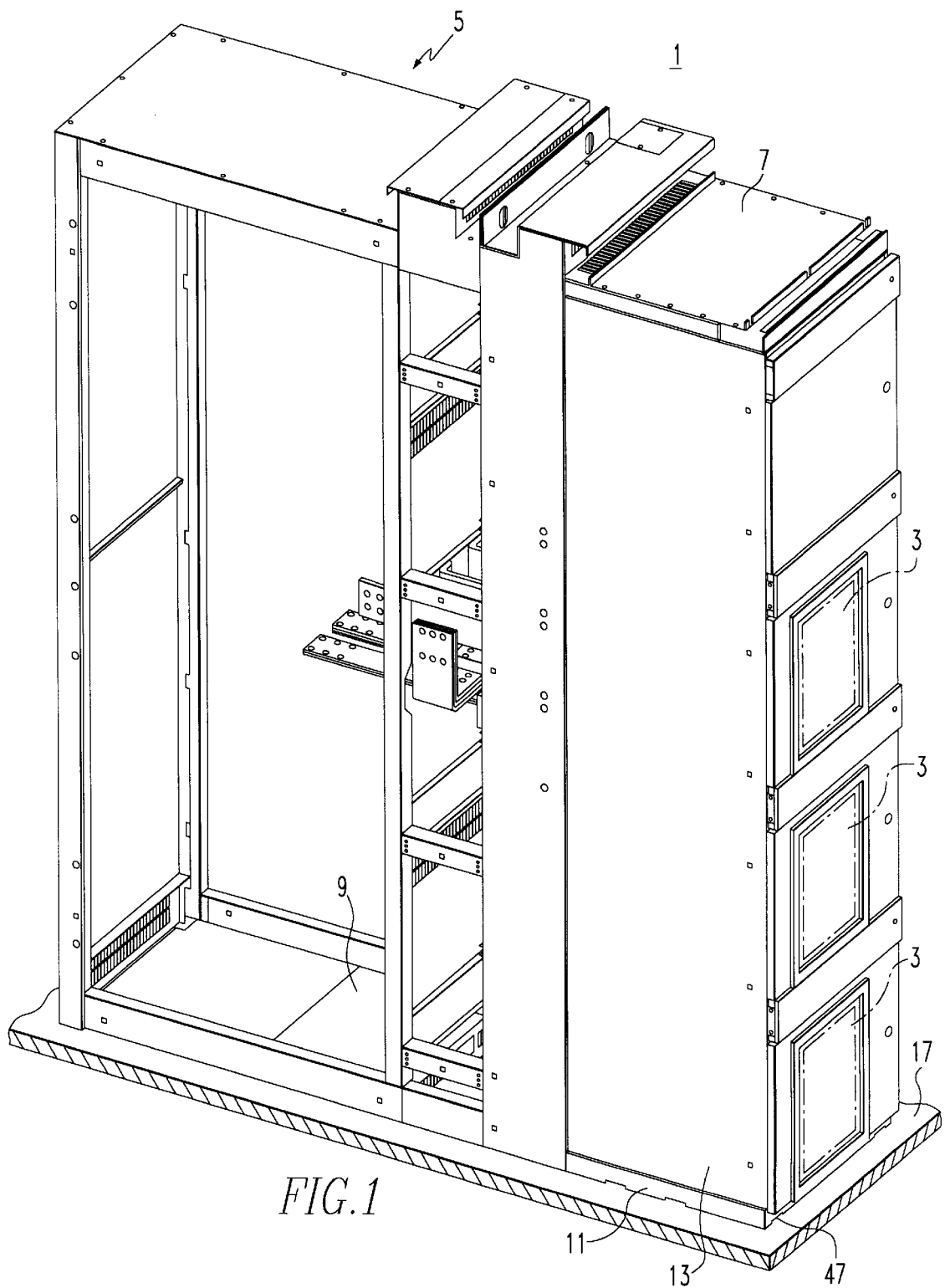
FIG. 1 is an isometric view of a switchgear assembly incorporating the invention.

Referring to FIG. 1, the switchgear assembly 1 includes electrical switching apparatus such as a power circuit breakers 3 (shown symbolically) mounted in a metal enclosure 5. As indicated, several circuit breakers 3 can be accommodated in the metal enclosure 5.

The enclosure 5 includes a first or front section 7 in which the circuit breakers 3 are mounted. In addition, there is a second or rear section 9 which accommodates the bus bars and/or cabling (not shown) which are connected to the circuit breakers 3.

The front section 7 of the metal enclosure 5 includes a base 11 and a number of structural members mounted on the base which form a housing 13 enclosing the circuit breakers 3.

Figure 2:
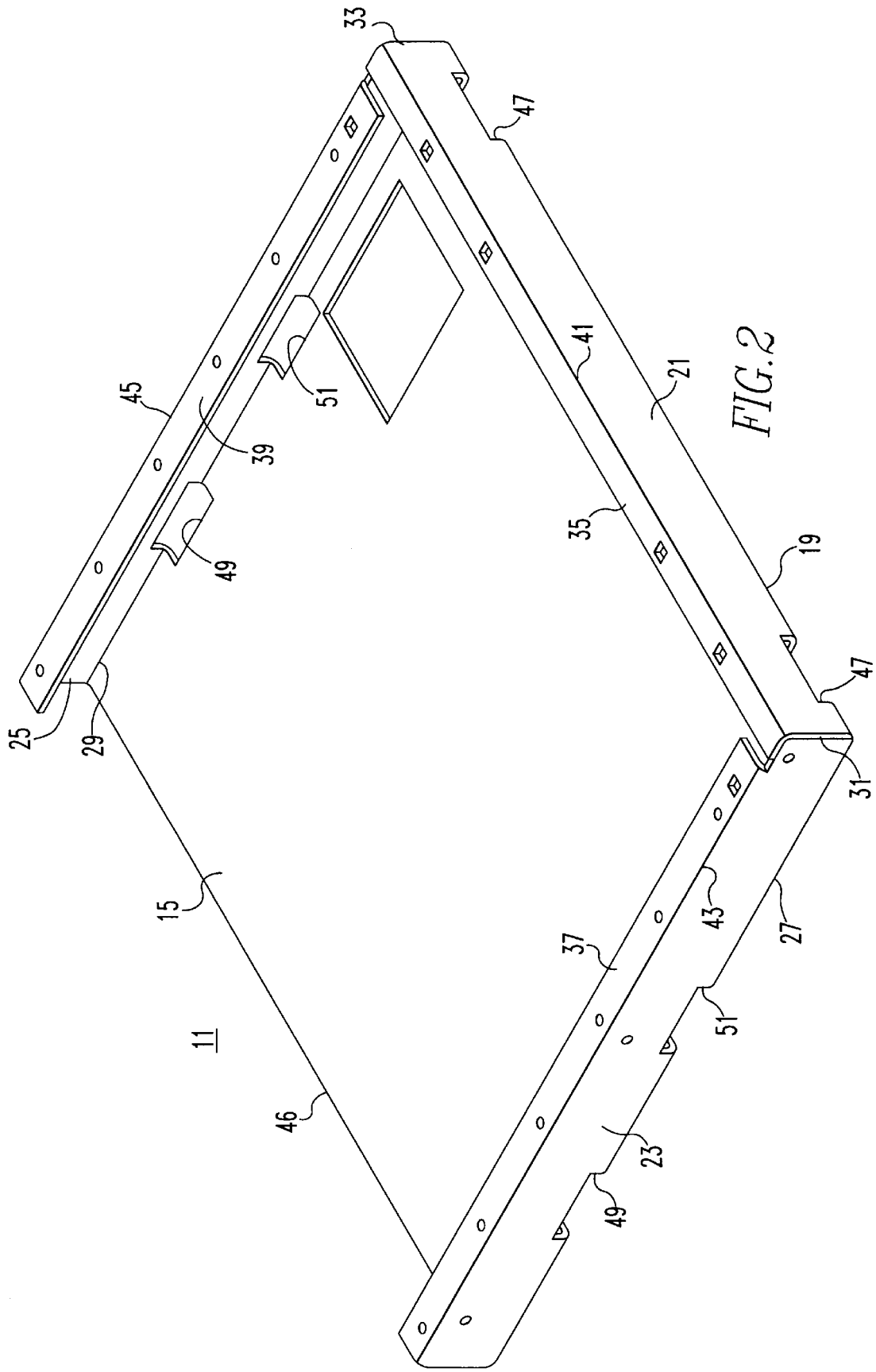
FIG. 2 is an isometric view of the base of the switchgear assembly of FIG. 1 in accordance with the invention.

While the base of the typical switchgear enclosure comprises a frame, the base 11 in accordance with the invention, comprises a planar member 15, as best seen in FIG. 2. This planar member 15 extends horizontally so that it rests flat upon the surface 17 supporting the switchgear assembly 1.

The planar member 15 has a first or front edge 19 along which extends an upturned first or front, integral flange 21. Similar integral flanges 23 and 25 are upturned along side edges 27 and 29, respectively, of the planar member 15. The front edge 19 and side edge 27, together with the flanges 21 and 23, form a first right-angle corner 31 while a similar right-angle corner 33 is formed by the edges 19 and 29 and flanges 21 and 25. Each of the flanges 21, 23 and 25 has an inwardly directed lip 35, 37 and 39 extending along a free edge 41, 43 and 45, respectively. The planar member 15 has a fourth or rear edge 46 facing the rear section 9 of housing but no flange is provided along this edge which is internal to the enclosure 5.

At least one, and preferably two, spaced-apart pry slots 47, are provided in the front edge 19. When two slots 47 are provided they are positioned near the ends of the front edge 19 adjacent the corners 31 and 33. Similar pry slots 49 and 51, again preferably two, are provided in the side edges 27 and 29.

Even though the second, or rear, section 9 of the enclosure 5 is deeper than the front section 7, the center of gravity of the enclosure 5 is within the front section 7 due to the weight of the circuit breakers 3 located there. Preferably, the side pry slots 49 and 51 straddle the center of gravity 53 front to rear.

Figure 3:
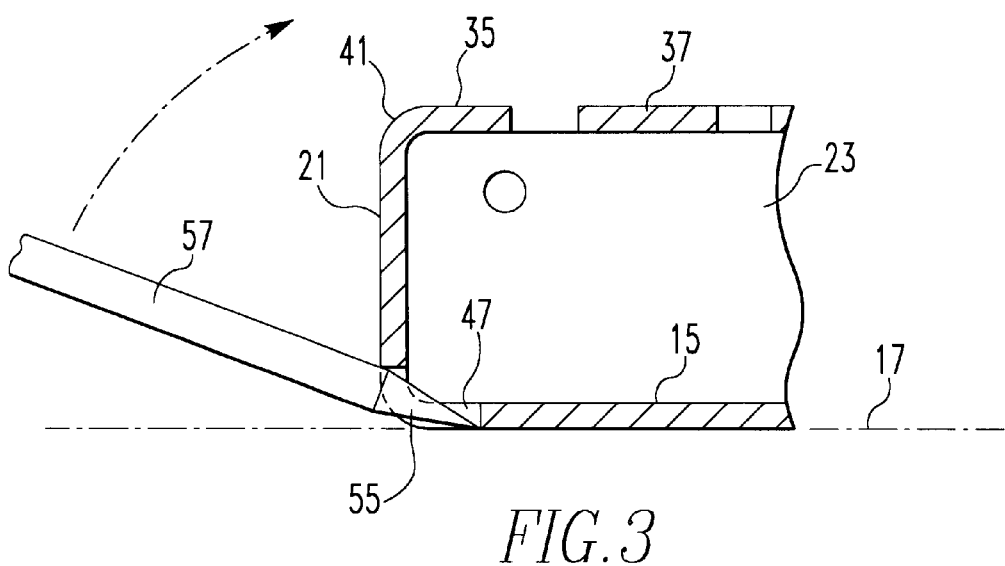
FIG. 3 is a fragmentary vertical section through the base illustrating engagement by a pry bar.

As shown in FIG. 3, the pry slots, such as the slots 47 in the front edge 19, extend into the planar member 15 and the flange 21 so that the blade 55 of the pry bar 57 can be inserted into the slot and positioned to rotate upward in the direction of the arrow to slide the planar member 15, and therefore the enclosure 5, to the right (rearward) as viewed in the figure. The pry slots 49 and 51 similarly extend into the base member 15 and the side flanges 23 and 25 to effect similar leverage for pry bars.

By having two pry slots 47 in the front edge 19, near the corners 31 and 33, two pry bars can be used to evenly or differentially move those corners rearward into position. By providing two spaced-apart pry slots 49 and 51 in the side edges 23 and 25 which straddle the center of gravity 55, the enclosure 5 can be levered laterally without rotating about a vertical axis through the center of gravity. Of course, differential levering could be employed if needed to rotate the enclosure.

It has been found that with the base 11 of the invention, that is the planar member 15 having the upturned flanges 19, 27 and 29 and the pry slots 47, 49 and 51 in the edges between the planar member and the flanges, the enclosure can be levered into place with pry bars 57, even with the circuit breakers 3 mounted within the enclosure 5, without damage to the enclosure, and specifically to the base.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An enclosure for electrical switching apparatus comprising:
    a base comprising a planar member having an upturned flange along at least one edge, and a pry slot, in said at least one edge extending into said at least one flange and into said planar member; and
    a housing mounted on said base.

2. The enclosure of claim 1 wherein said flange has a free edge and an inwardly directed lip extending along said free edge.

3. The enclosure of claim 1 wherein said planar member has two pry slots spaced along said one edge.

4. The enclosure of claim 1 wherein said planar member has upturned flanges extending along multiple edges, each having at least one of said pry slots.

5. The enclosure of claim 4 wherein said multiple flanges comprise three flanges forming two right-angle corners between them.

6. The enclosure of claim 5 wherein a first flange of the three flanges is a front flange between said two right-angle corners and wherein two spaced-apart pry slots are formed in said edge between said planar member and said first flange.

7. The enclosure of claim 6 wherein said two pry slots in said edge between said front flange and said planar member are positioned adjacent said two right-angle corners.

8. The enclosure of claim 5 wherein each of said three flanges has an inwardly directed lip extending along a free edge.

9. The enclosure of claim 5 wherein the edges between all of said three flanges and said planar member each have two pry slots therein.

10. The enclosure of claim 9 wherein each of said three flanges has an inwardly directed lip extending along a free edge.

11. Electrical switchgear adapted for positioning on a horizontal surface by pry bar means, said switchgear comprising:
    electrical switching apparatus; and
    an enclosure housing said electrical switching apparatus and comprising:
        a first section having a base in the form of a planar member positioned to rest on said horizontal surface and having an upturned flange at least along one edge and at least one pry slot in said one edge and extending into said planar member and into said upturned flange, said pry slot being sized for engagement by said pry bar means.

12. The switchgear of claim 11 wherein said planar member has additional upturned flanges along two additional edges, said one edge and said two additional edges forming two right-angle corners, said two additional edges also having at least one pry slot extending into said planar member and said additional upturned flanges.

13. The switchgear of claim 12 wherein a first of said one edge and said two additional edges comprises a front edge and second and third of said one edge and said two additional edges comprise side edges, said front edge having two of said pry slots spaced apart along said front edge.

14. The switchgear of claim 13 wherein said two pry slots in said front edge are positioned adjacent said two right-angle corners.

15. The switchgear of claim 13 wherein said enclosure includes a second section adjoining said first section adjacent a fourth edge of said planar member, said enclosure having a combined center of gravity for said first and second sections which falls within said first section, and wherein said side edges of said planar member each have two spaced apart pry slots straddling said center of gravity.

16. The switchgear of claim 15 wherein said flanges each have an inwardly directed lip extending along a free edge thereof.

17. The switchgear of claim 16 wherein said two pry slots in said front edge are located adjacent said right-angle corners.

18. The switchgear of claim 11 wherein said planar member has two spaced-apart pry slots along said at least one edge.

19. The switchgear of claim 18 wherein said one edge is a front edge of said planar member and said two pry slots are positioned adjacent ends of said one edge.

20. The switchgear of claim 19 wherein said upturned flange has an inwardly directed lip extending along a free edge thereof.

* * * * *